United States Patent [19]

Ichida

[11] Patent Number: 5,324,118
[45] Date of Patent: Jun. 28, 1994

[54] LINEAR MOTION ROLLING GUIDE UNIT

[75] Inventor: Tomohiro Ichida, Tokyo, Japan

[73] Assignee: Nippon Thompson Co., Ltd., Tokyo, Japan

[21] Appl. No.: 46,170

[22] Filed: Apr. 15, 1993

[30] Foreign Application Priority Data

Apr. 16, 1992 [JP] Japan .................. 4-121124

[51] Int. Cl.⁵ .................................. F16C 29/06
[52] U.S. Cl. ................................................ 384/44
[58] Field of Search ........................ 384/44, 43, 45; 464/168

[56] References Cited

U.S. PATENT DOCUMENTS

| 4,511,189 | 4/1985 | Mottate | 384/44 |
| 4,659,238 | 4/1987 | Teramachi | 384/44 |
| 4,688,950 | 8/1987 | Yokota | 384/44 |

FOREIGN PATENT DOCUMENTS 1175564 7/1989 Japan .
463812 5/1992 Japan .

*Primary Examiner*—Lenard A. Footland
*Attorney, Agent, or Firm*—Browdy and Neimark

[57] ABSTRACT

The linear motion rolling guide unit of this invention makes the total lengths of the retainer plates, which support the cylindrical rolls, longer than that of the casing so that the retainer plates can be inserted into the end caps for assembly. This simplifies the construction and reduces manufacturing costs. The retainer plates each comprise retaining portion formed with two or more rows of slots that support the cylindrical rolls in such a way as to allow the rotating motion of the rolls, a bent portion which is bent away from the track rail, and locking portions projecting from both ends of the bent portion. The locking portions fit into recesses in the end caps, the bent portion fits into grooves in the end caps, and the upper end portion of the retainer fits into grooves in the end caps.

10 Claims, 4 Drawing Sheets

LINEAR MOTION ROLLING GUIDE UNIT

BACKGROUND OF THE INVENTION

1. Field of the Invention

The present invention relates to a linear motion rolling guide unit which is applied to sliding portions and rotating portions of machining tools, various precision machining equipments and testing equipments.

2. Description of the Prior Art

Conventional linear motion rolling guide units include a track rail formed with two or more raceway surfaces extending longitudinally on both side walls thereof; a slider having raceway surfaces facing those of the track rail and straddling the track rail; and a number of rolling elements that travel rolling between the facing raceway surfaces. In such rolling guide units, various kinds of retainers have been developed that support the rolling elements on a loaded area of the raceway surfaces. Many retainers consist of a flat plate member which is formed, when the rolling elements are balls, with a slit a slightly narrower than the ball diameter so that the balls can be supported by the slit.

The slider that slides on the track rail has a casing and end caps secured to the ends of the casing. It also has end seals attached to the ends of the end caps and an under seal attached to the underside of the slider. Further, the conventional linear motion rolling guide unit also has a number of rolls that travel rolling along the raceway formed between the raceway surface on the track rail and the raceway surface on the casing, and a retainer plate secured to the casing to hold the rolls in the casing.

Among such rolling guide units there is a four-raceway endless linear motion rolling guide unit. The four-raceway endless linear motion rolling guide unit will be explained by referring to FIG. 10, 11 and 12.

The four-raceway endless linear motion rolling guide unit has a track rail 1 almost I-shaped in cross section; a slider 2 mounted astride on the track rail 1 so that it is slidable on the rail; and a number of cylindrical rolls 3 rollably interpoped between the track rail 1 and the slider 2 so that the center axes of the adjacent rolls in the loaded area are parallel to each other. The track rail 1 is formed with recessed grooves 8 extending longitudinally on both side walls 18 thereof, the grooves 8 constituting the raceway surfaces 5, 6. Upper and lower edge portions of the grooves 8 of the track rail 1 are formed as inclined surfaces constituting an upper raceway surface 5 and a lower raceway surface 6. The slider 2 has a casing 4 which is formed with a recessed portion 10 so that the casing can straddle the track rail 1, and end caps 7 attached to both longitudinal ends of the casing 4. To seal the boundary between the track rail 1 and the slider 2 when the slider 2 slides on the track rail 1, the ends of the end caps 7 are each provided with an end seal 20 (FIG. 11) and the underside of the slider 2 with an under seal 22.

The recessed portion 10 of the casing 4 is formed with an upper raceway surface 11 and a lower raceway surface 12 at positions corresponding to the upper raceway surface 5 and the lower raceway surface 6 of the track rail 1. Between the upper raceway surface 11 and the lower raceway surface 12 of the casing 4 is formed an engagement groove 15, which engages with an engagement projection 16 formed on a retainer plate 9. The retainer plate 9 is loosely fitted in part in the recessed groove 8 of the track rail 1 and also fixed to the casing 4 by bolts 17.

In the above construction of the 4-raceway endless linear motion rolling guide unit, two raceways are formed on each side of the track rail 1 by the upper and lower raceway surfaces 5, 6 on the track rail 1 and the upper and lower raceway surfaces 11, 12 on the casing 4. Hence, a total of four raceways are formed on both sides of the track rail 1. In these loaded roller raceways, a number of cylindrical rolls 3 rotate in contact with the facing raceway surfaces 5 and 11 and with the facing raceway surfaces 6 and 12. The casing 4 is formed with return passages 13, 14, and the end caps 7 are formed with direction changing passages 32, 36 (FIG. 11) that connect the loaded roller raceways and the return passages 13, 14. Hence, the loaded roller raceways, the direction changing passages 32, 36, and return passages 13, 14 form two endless circulating paths on one side. One of the endless circulating paths is, for example, disposed inside the other. That is, the two endless circulating paths have different lengths, with the shorter one placed inside the loop of the longer one in such attitudes that they cross but do not interfere with each other. The longer endless circulating path and the shorter endless circulating path have the same lengths of the loaded raceways. When the slider 2 slides on the track rail 1, a number of cylindrical rolls 3 circulate through the longer endless circulating path and another group of cylindrical rolls 3 circulate through the shorter endless circulating path. Though not shown, it is possible to form the two endless circulating paths in the same lengths by making them cross each other or to form them in upper and lower parallel paths.

Examples of such four-raceway endless linear motion rolling guide units include those of Japanese Patent Laid-Open Nos. 175564/1989 and Japanese Patent Application Nos. 106311/1990 and 166326/1991.

In the conventional four-raceway endless linear motion rolling guide unit, the mounting of the end caps 7 to the casing 4 requires precise positioning of the end caps 7 to correctly form two endless circulating paths with the loaded roller raceways, the direction changing passages 32, 36 and the return passages 13, 14 and thereby allow smooth rotating motion of the rolls 3 through the endless paths. It is also necessary to form an appropriate sliding surface at the boundary between the track rail 1 and the slider 2 to ensure a good seal.

When the retainer plate 9 is to be mounted to the casing 4, it is a common practice to pass the bolt 17 through a hole 23 in the casing 4 and screw it into a threaded hole in the retainer plate 9 to secure the retainer plate 9 to the casing 4. Further, the retainer plate 9 is required to have an engagement projection 16 that snugly fits in the engagement groove 15 formed in the casing 4. This in turn requires high machining precision not only for the retainer plate 9 but for the casing 4, raising the manufacturing cost.

SUMMARY OF THE INVENTION

A primary object of this invention is to solve the above-mentioned problems. That is, it is an object of the invention to provide a linear motion rolling guide unit, which is characterized in that the total length of the retainer plate which holds two or more rows of rolling elements in raceways is made longer than that of the casing, that the retainer plate is formed with two or more rows of slots that accept and hold the rolling elements in such a manner as to allow the rolling elements to move rolling, and that locking portions of the retainer are inserted into locking grooves in the end caps to fix the retainer plate to the end caps. Unlike the conventional devices, this linear motion rolling guide unit is not required to form threaded holes in the retainer plate or to machine with high precision the surfaces of the retainer plate that engage with the rolling elements, thus simplifying the construction and reducing the manufacturing costs.

Another object of the present invention is to provide a linear motion rolling guide unit, which comprises: a track rail formed with raceway surfaces extending longitudinally on both side walls thereof; a casing movable relative to the track rail and having raceway surfaces formed at positions facing the raceway surfaces of the track rail; rolling elements traveling rolling between the facing raceway surfaces; end caps having direction changing passages communicating with the raceway surfaces, the end caps being mounted to longitudinal ends of the casing; and retainer plates disposed between the track rail and the casing to support the rolling elements; wherein the total lengths of the retainer plates are longer than that of the casing, the end caps are formed with recesses, and the retainer plates have a retaining means to support the rolling elements in such a way as to allow the rolling elements to move rolling, and a locking means that fits into the recesses of the end caps.

In this linear motion rolling guide unit, the retaining means of the retainer plates are two on more rows of slots that accept and support the rolling elements in such a way as to allow the rolling elements to move rolling, and the locking means of the retainer plates comprise bent portions of the lower end of the retainer plates which are bent away from the track rail and locking portions projecting from both ends of the bent portions.

Further, the recesses formed in the end caps are grooves that extend in the direction of slider movement, and the locking portions at both ends of the bent portions of the retainer plates fit in the grooves formed in the end caps.

The upper end portion of the retaining portion of the retainer plate is fitted into grooves in the end caps that are cut upward along the inner side walls of the end caps. The rolling elements are formed of cylindrical rolls.

This linear motion rolling guide unit has a simple construction in which the retainer plate is only required to be formed with slots that support the rolling elements. The machining precision required to form the slots is not high. Simply by inserting the locking portions formed at the ends of the retainer plate into the recesses in the end caps, the retainer plate can be reliably and firmly secured to the end caps, thus keeping the rolling elements in the raceways. Moreover, the retainer plate will not buckle or deform. Therefore it is possible to reliably hold the rolling elements in the casing and securely hold the retainer plate in firm contact with the casing and the end caps at all times.

Hence, there is no need to drill threaded holes in the casing and retainer plates, as is required with the conventional units, reducing the number of parts and therefore the manufacturing cost. The mounting and demounting of the retainer plate to and from the end caps can very easily be done, improving the assembly performance of the unit.

Furthermore, in this linear motion rolling guide unit, if the end surfaces of the bent portion of the retainer plate are made to abut against the end surfaces of the grooves that extend in the end caps in the slider motion direction, the retainer plate can work as a stopper to restrict excessive movement of the bent portion with respect to the end caps. This prevents the bent portion from moving beyond a certain limit, i.e. from coming off the end caps.

DETAILED DESCRIPTION OF EMBODIMENTS

Figure 1:
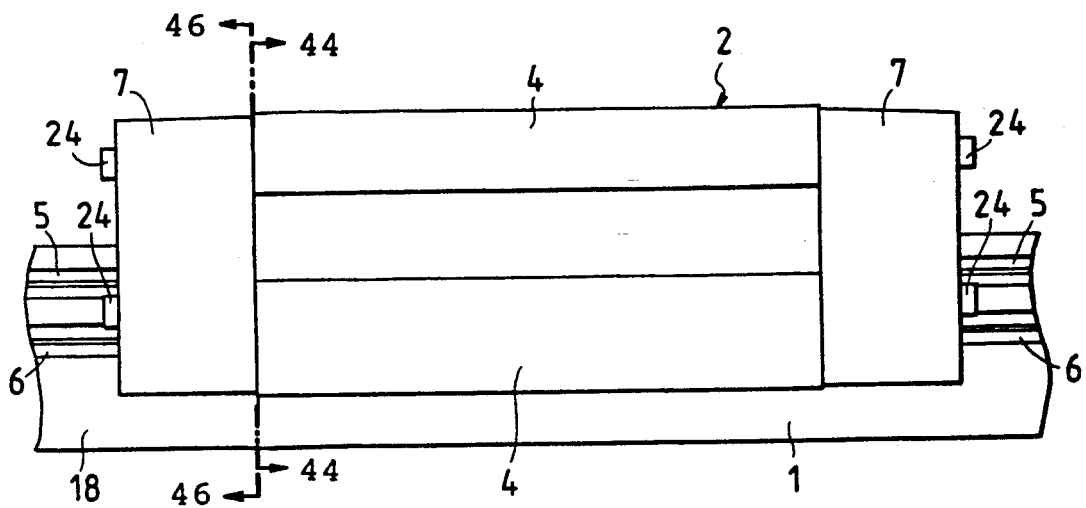
FIG. 1 is a front view of the linear motion rolling guide unit as one embodiment of the present invention.

Now, by referring to the accompanying drawings, an embodiment of the linear motion rolling guide unit according to this invention will be described. The linear motion rolling guide unit of this invention has basically the same function as the above-mentioned four-raceway endless linear motion rolling guide unit and thus identical parts are given like reference numerals.

Figure 2:
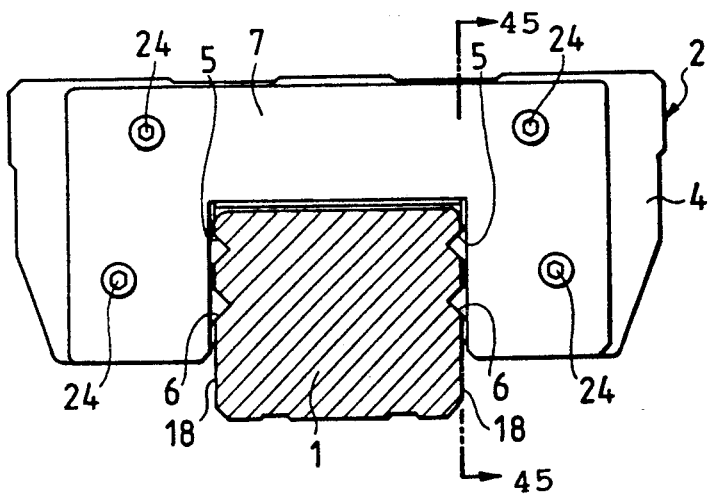
FIG. 2 is a side view of FIG. 1.
Figure 3:
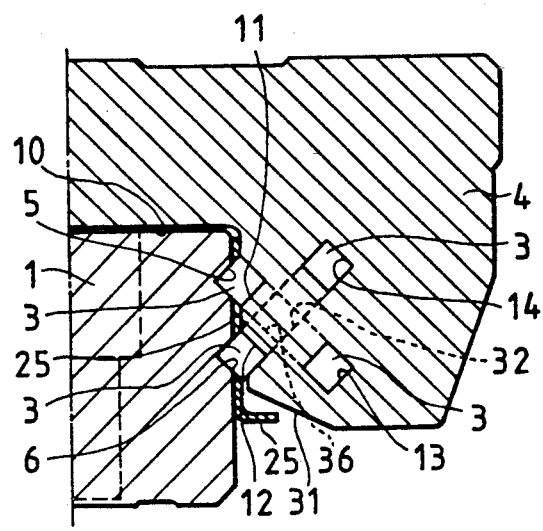
FIG. 3 is a cross section taken along the line 44—44 of FIG. 1 and as seen from the arrow.

As shown in FIG. 1, 2 and 3, this linear motion rolling guide unit includes: a track rail 1 formed with upper raceway surfaces 5 and lower raceway surfaces 6 longitudinally extending on both side walls 18 thereof; and a slider 2 mounted astride the track rail 1 so that it is movable relative to the track rail 1. The slider 2 is slidable on the track rail 1 and consists of: a casing 4 having upper raceway surfaces 11 and lower raceway surfaces 12 formed at positions facing the upper raceway surfaces 5 and the lower raceway surfaces 6 of the track rail 1 respectively; end caps 7 attached to the longitudinal ends of the casing 4; a retainer plate 25 disposed between the track rail 1 and the casing 4; and cylindrical rolls 3 which constitute rolling elements and circulate rolling between the facing raceway surfaces 5 and 11 and between the facing raceway surfaces 6 and 12.

Though not shown, the linear motion rolling guide unit also has end seals attached to the end surfaces of the end caps 7, which are mounted to the longitudinal ends of the casing 4, and an under seal mounted to the underside of the Casing 4 and the end caps 7. The end caps 7 are mounted to the end surfaces of the casing 4 by screws 24 inserted through mounting holes in the end caps 7. On their inner side the end caps 7 each have direction changing passages 32, 36 formed on both sides for changing the direction of travel in which the cylindrical rolls 3 circulate between the facing raceway surfaces of the casing 4 and the track rail 1. The casing 4 is formed with return passages 13, 14 for the upper and lower raceway surfaces 11, 12 in such a manner that they will communicate with the direction changing passages 32, 36 formed in the end caps 7.

Figure 4:
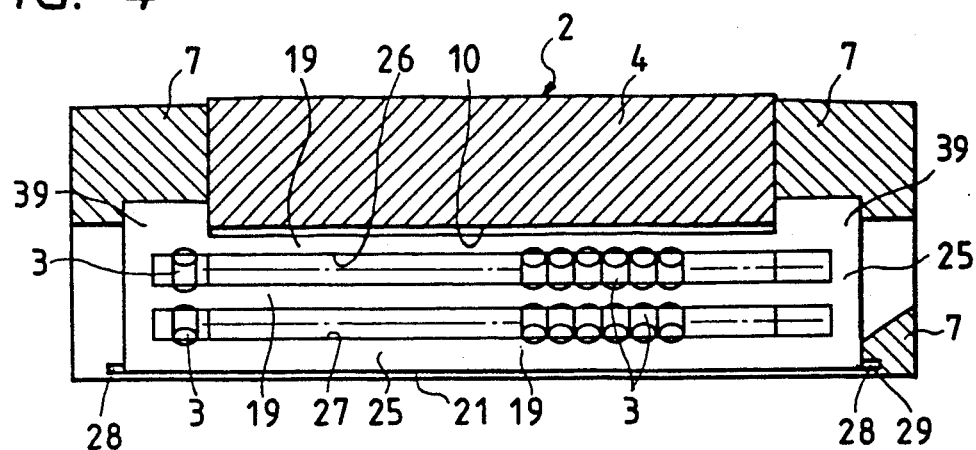
FIG. 4 is a cross section taken along the line 45—45 of FIG. 2 and as seen from the arrow.
Figure 7:
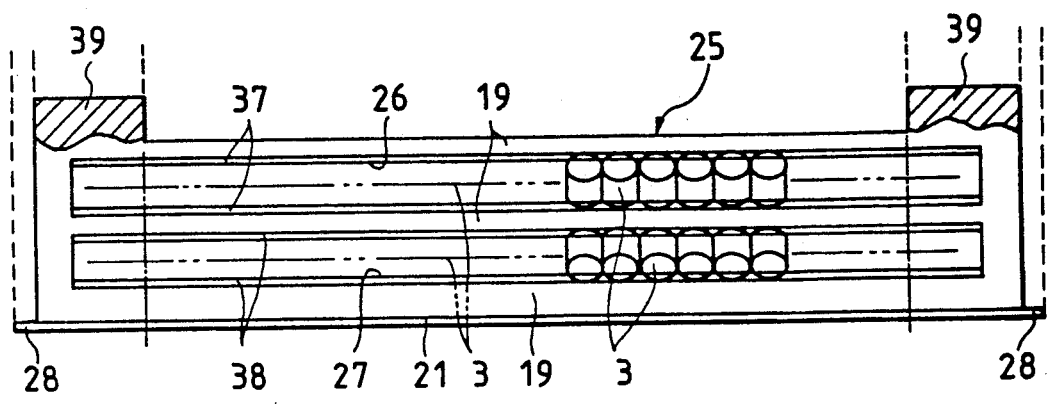
FIG. 7 is a front view of one embodiment of the retainer plate incorporated into the linear motion rolling guide unit of this invention.

The linear motion rolling guide unit is characterized by the retainer plate 25, whose total length is greater than that of the casing 4. As shown in FIG. 4 and 7, the retainer plate 25 has two slots 26, 27, upper and lower, that accept and support the cylindrical rolls 3 so that the rolls 3 can rotate and run along the slots. The retainer plate 25 has a retaining portion 19 that supports the cylindrical rolls 3 by the edges of the slots 26, 27.

Figure 8:
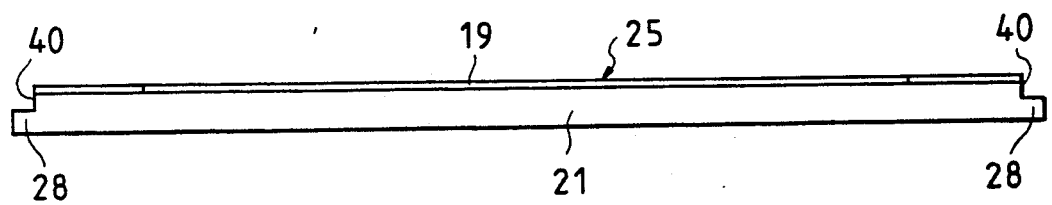
FIG. 8 is a plan view of FIG. 7.
Figure 9:
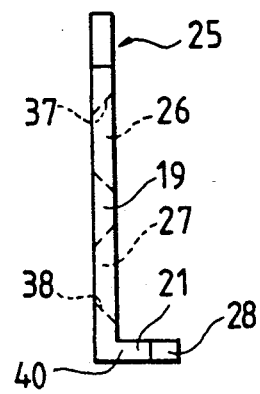
FIG. 9 is a side view of FIG. 7.
Figure 10:
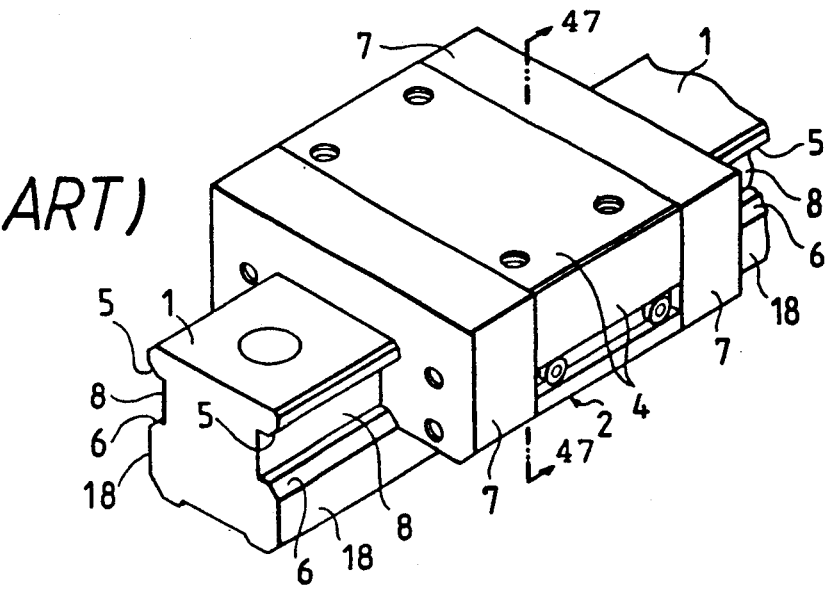
FIG. 10 is a perspective view of one example of a conventional linear motion rolling guide unit.
Figure 11:
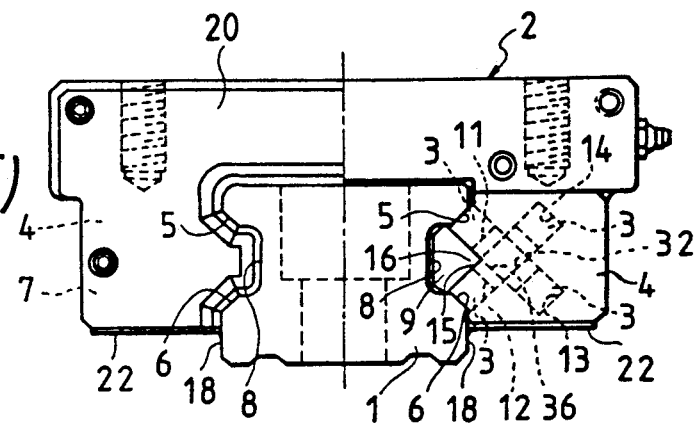
FIG. 11 is a side view of FIG. 10.
Figure 12:
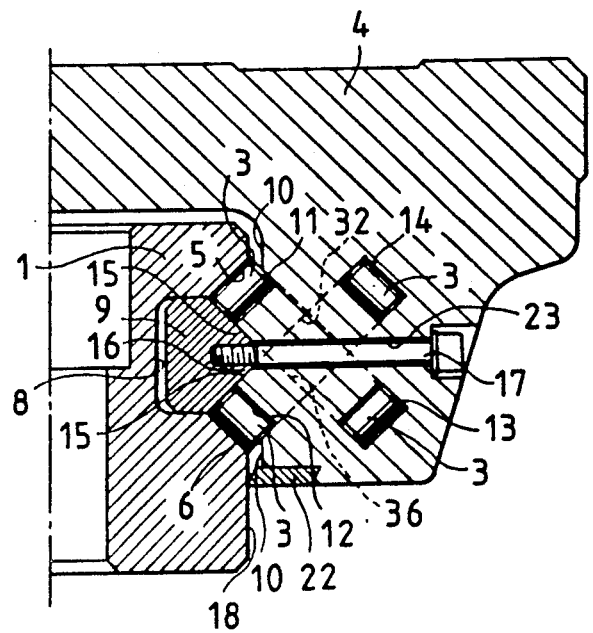
FIG. 12 is a cross section taken along the line 47—47 of FIG. 10.

Further, as shown in FIG. 8 and 9, the retainer plate 25 has its lower end portion bent at right angles away from the track rail 1 to form a bent portion 21, which has locking portions 28 projecting from the longitudinal ends of the bent portion 21. The slots 26, 27 of a predetermined width extend in the longitudinal direction of the retainer plate 25. The width is such that the cylindrical rolls 3 cannot pass the slots but can project therethrough and travel rolling on the raceway surfaces 5, 6 of the track rail 1. Furthermore, cut surfaces of the slots 26, 27, i.e. support surfaces 37, 38 for the cylindrical rolls 3 are inclined according to those surfaces of the cylindrical rolls 3 that contact the retainer plate 25, in other words, according to the working roll surfaces and the end surfaces of the cylindrical rolls 3. The support surfaces 37, 38 of the slots 26, 27 or pockets formed in the retainer 25 for supporting the cylindrical rolls 3 preferably have an inclination such that they fit the contours of the cylindrical rolls 3. In this case, the support surfaces 37, 38 should preferably be inclined 45 degrees with respect to the plane of the retainer plate 25.

Figure 5:
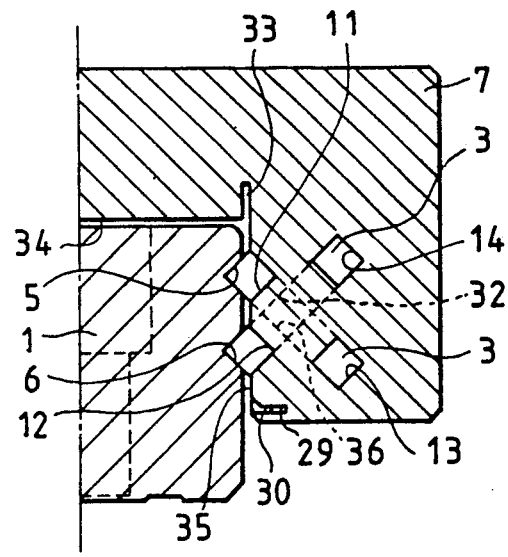
FIG. 5 is a cross section taken along the line 46—46 of FIG. 1 and as seen from the arrow, with the retainer plate removed.

The bent portion 21 of the retainer plate 25 that faces the casing is disposed below the underside 31 of the casing 4. The end cap 7 has a recessed portion 34 to accommodate the track rail 1 and, as shown in FIG. 5, the recessed portion 34 is formed with an engagement groove 33 that is cut upward along the inner side surface 35. FIG. 5 shows the cross section of the end cap 7 with the retainer plate 25 removed. The end cap 7 is formed with an engagement groove 30 that extends halfway in the direction of the slider movement and also with an engagement hole 29 that is cut into the end cap from the end of the engagement groove 30.

Figure 6:
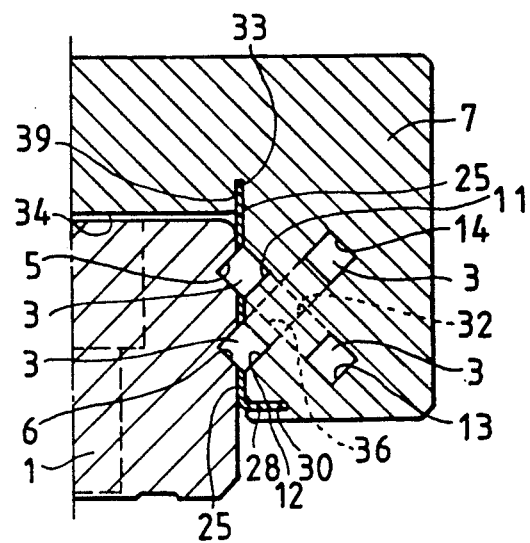
FIG. 6 is a cross section taken along the line 46—46 of FIG. 1 and as seen from the arrow, with the retainer plate installed in the end caps.

The bent portion 21 of the retainer plate 25, as shown in FIG. 6, is fitted into the engagement grooves 30 in the end caps 7. The locking portions 28 at the ends of the bent portion 21 are fitted into the engagement holes 29 in the end caps 7. An upper end portion 39 of the retainer plate 25 is fitted into the engagement groove 33 in the end cap 7. Hence, when the retainer plate 25 is mounted to the end caps 7, the upper end portion 39 of the retainer plate 25 is fitted into the engagement grooves 33 of the end caps 7 and the locking portions 28 formed at the ends of the retainer plate 25 are fitted in the engagement holes 29 of the end caps 7, thereby securely holding the retainer plate 25 to the end caps 7 with the retaining portion 19 of the retainer plate 25 in contact with the inner side surfaces 35 of the end caps 7. Therefore, the retainer plate 25 is prevented from being deflected by the weight of the cylindrical rolls 3 toward the track rail 1, so that the cylindrical rolls 3 can be firmly supported in the casing 4.

If in this linear motion rolling guide unit, the end surface 40 of the bent portion 21 of the retainer plate 25 is made to abut against the end surface of the engagement groove 30 in the end cap 7 that extends in the direction of the slider movement, the retainer plate 25 then works as a stopper for the end cap 7 restricting an excess movement of the bent portion 21. As a result, the retainer plate 25 will not move excessively relative to the end caps 7 and can be prevented from coming off the end cap 7.

In such a linear motion rolling guide unit, the slider 2 may be assembled, for example, in the following process. One of the end caps 7 is mounted to one longitudinal end of the casing 4 by screws 24. The cylindrical rolls 3 are installed on the raceway surfaces 11, 12 of the casing 4, in the direction changing passages 32, 36 in the end cap 7 and in the return passages 13, 14 in the casing 4. Next, the upper end portion 39 of the retaining portion 19 of the retainer plate 25 is fitted into the engagement groove 33 of the end cap 7, the bent portion 21 of the retainer plate 25 is fitted into the engagement groove 30 of the end cap 7, and the retainer plate 25 is pushed into the end cap 7 to engage the locking portion 28 of the retainer plate 25 into the engagement hole 29 in the end cap 7. Then, the cylindrical rolls 3 are loaded into the direction changing passages 32, 36 in the other end cap 7, the upper end portion 39 of the retaining portion 19 is fitted into the engagement groove 33 of the second end cap 7, and the bent portion 21 of the retainer plate 25 is fitted into the engagement groove 30 of the second end cap 7. This is followed by the end cap 7 being pushed against the casing 4 to cause the locking portion 28 of the retainer plate 25 to fit into the engagement hole 29 in the end cap 7. In the last step, the screws 24 are passed through the mounting holes in the end caps 7 and screwed into the casing 4, thereby securely fixing the end caps 7 to the casing 4.

In the above embodiment of the linear motion rolling guide unit, the two raceway surfaces 11, 12 formed on the casing 4 are connected through the direction changing passages 32, 36 in the end caps 7 to the return passages 13, 14 so that the two raceways cross each other. It is also possible to form the raceways - made up of the raceway surfaces, the direction changing passages and the return passages - in two parallel, horizontal passages, one above the other.

I claim:
1. A linear motion rolling guide unit comprising:
a track rail formed with raceway surfaces extending longitudinally on both side walls thereof;
a casing movable relative to the track rail and having raceway surfaces formed at positions facing the raceway surfaces of the track rail;
rolling elements traveling rolling between the raceway surfaces of the track rail and the raceway surfaces of the casing;
end caps having direction changing passages communicating with the raceway surfaces of the casing, the end caps being mounted to longitudinal ends of the casing; and
retainer plates disposed between the track rail and the casing to support the rolling elements;
wherein the total lengths of the retainer plates are longer than that of the casing, the end caps are formed with recesses, and the retainer plates have a retaining means to support the rolling elements in such a way as to allow the rolling elements to move rolling, and a locking means that fits into the recesses of the end caps.

2. A linear motion rolling guide unit according to claim 1, wherein the retaining means of the retainer plates are slots that accept and support the rolling elements in such a way as to allow the rolling elements to move rolling.

3. A linear motion rolling guide unit according to claim 2, wherein the slots have a predetermined width and extend in the longitudinal direction of the retainer plates, and the size of the width is such that the rolling elements cannot pass the slots but can project therethrough to move rolling on the raceway surfaces of the track rail.

4. A linear motion rolling guide unit according to claim 2, wherein edges of the slots constitute support surfaces for the rolling elements.

5. A linear motion rolling guide unit according to claim 1, wherein the rolling elements are cylindrical rolls having a working roll surface and end surfaces on both sides thereof.

6. A linear motion rolling guide unit according to claim 5, wherein the edges of the slots are formed inclined according to the working roll surface and one of the end surfaces of the rolling elements.

7. A linear motion rolling guide unit according to claim 1, wherein the locking means of the retainer plates comprise bent portions at the lower end of the retainer plates which are bent away from the track rail and locking portions projecting from both ends of the bent portions.

8. A linear motion rolling guide unit according to claim 7, wherein the bent portions of the retainer plates are located below the underside of the casting.

9. A linear motion rolling guide unit according to claim 7, wherein the recesses formed in the end caps are grooves that extend in the direction of slider movement, and the locking portions at both ends of the bent portions of the retainer plates fit in the grooves formed in the end caps to restrict the vertical movement of the retainer plates.

10. A linear motion rolling guide unit according to claim 1, wherein the recesses formed in the end caps are grooves cut upward along the inner side surfaces of the end caps, the locking means of the retainer plates are upper end portions of the retainer plates extending upward at both ends of the retainer plates, and the upper end portions of the retainer plates fit into the grooves to restrict the lateral movement of the retainer plates, thereby supporting the rolling elements on the raceway surfaces of the casing.

* * * * *